Dec. 30, 1930.   T. S. BINDSCHEDLER ET AL   1,786,888
ALTERNATING CURRENT GENERATOR
Filed April 5, 1928   2 Sheets-Sheet 1

INVENTORS
Theodore S. Bindschedler
and
BY   William A. Wood
Francis D. Hardesty,
ATTORNEY.

Dec. 30, 1930. T. S. BINDSCHEDLER ET AL 1,786,888
ALTERNATING CURRENT GENERATOR
Filed April 5, 1928   2 Sheets-Sheet 2
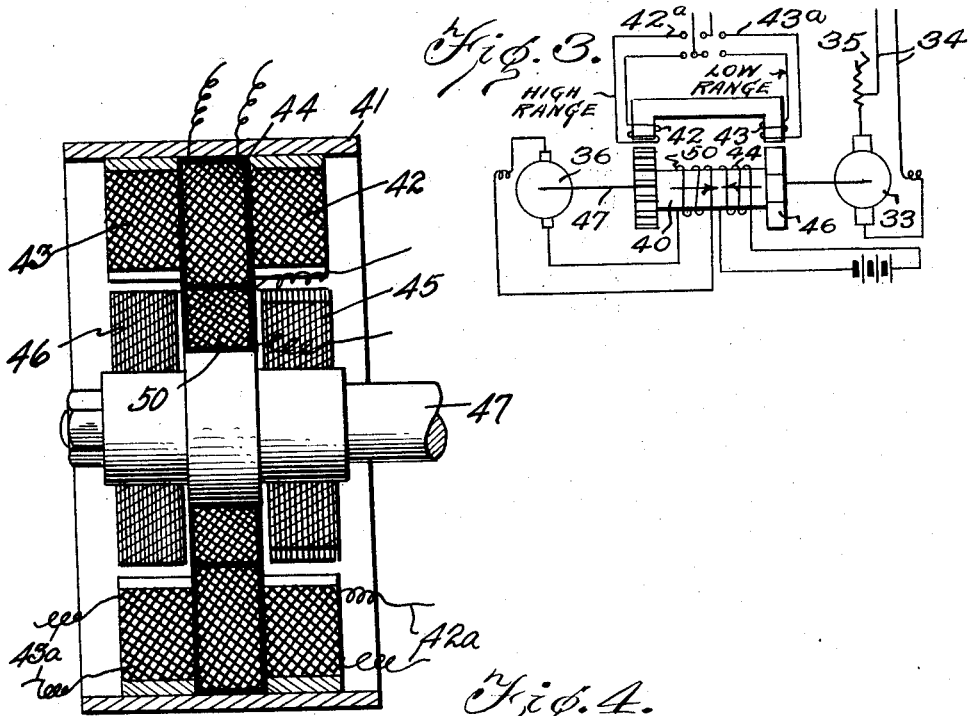
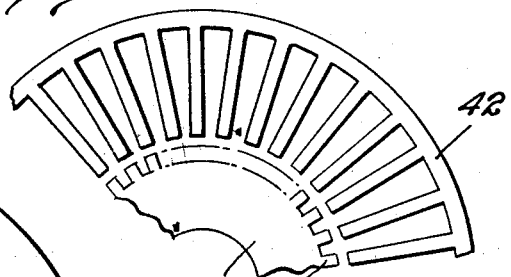
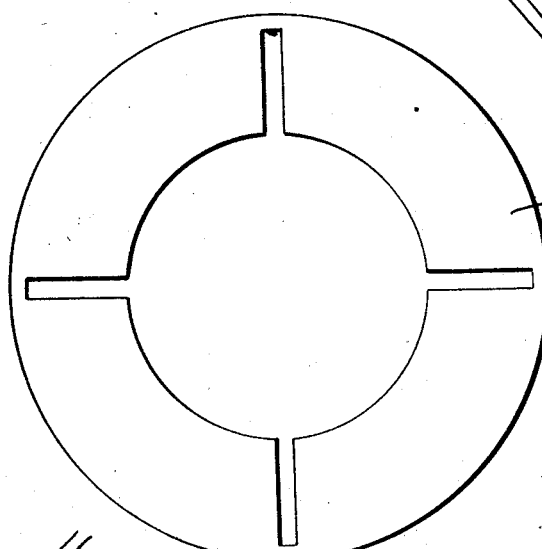
INVENTOR.
Theodore S. Bindschedler
and
William A. Wood
BY
Francis D. Hardesty
ATTORNEY.

Patented Dec. 30, 1930

1,786,888

UNITED STATES PATENT OFFICE

THEODORE S. BINDSCHEDLER AND WILLIAM A. WOOD, OF DETROIT, MICHIGAN, ASSIGNORS TO THE STEEL PENETROMETER COMPANY, OF DETROIT, MICHIGAN, A CORPORATION OF MICHIGAN

ALTERNATING-CURRENT GENERATOR

Application filed April 5, 1928. Serial No. 267,574.

The present invention relates to means for generating alternating electric currents and specifically to means capable of generating alternating current of any frequency between very wide limits.

Among the objects of the invention is generating means which permits the variation of the frequency over a wide range while varying the voltage by any amount desired.

Another object is means by which such a wide range of frequencies may be obtained without at the same time developing mechanical difficulties.

Still other objects will readily occur to those skilled in the art upon reference to the following description and accompanying drawings in which:—

Fig. 2 is a section through the windings of the alternator;

Fig. 3 is a schematic diagram of a device embodying the invention;

Fig. 4 is a part elevation of the field magnet and the motor of the alternator;

Fig. 5 is an elevation of the other side of the rotor; and

Fig. 6 is an elevation of the field magnet for the rotor of Fig. 5.

Figure 1:
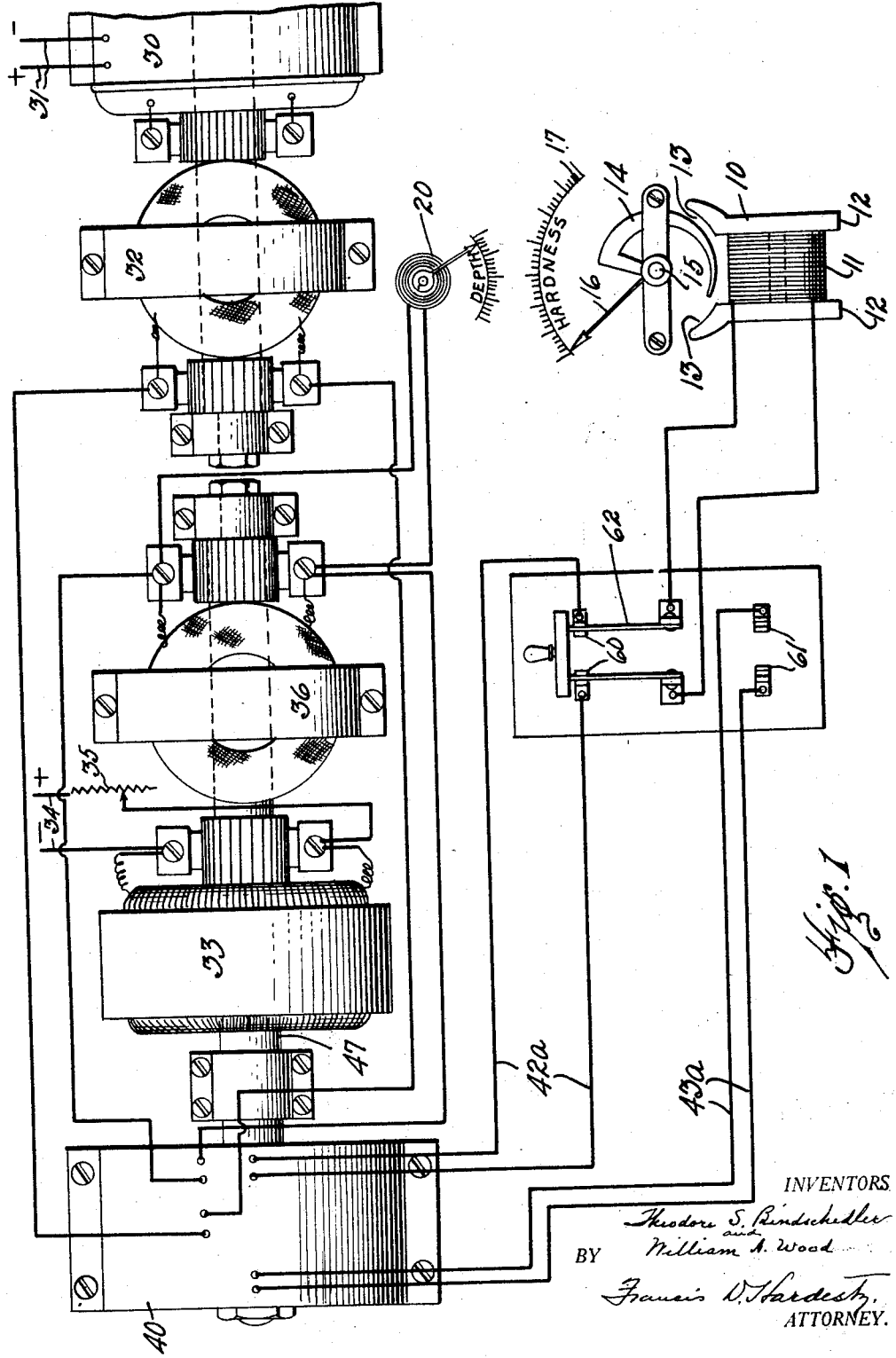
Fig. 1 is a plan view of the generating means and the essentials of an instrument for use therewith.

In application Serial Number 95,597 filed on March 18, 1926, on magnetic balances by the present inventors is described an instrument for determining the hardness and the depth thereof of steels and the like based on the fact that alternating magnetic flux of constant value penetrates such metals to a depth that bears a definite relation to the frequency of the alternations, and also based on the fact that the hardness is indicated by the resistance of the metal to the passage of such flux.

The instrument indicated in the lower right hand corner of Figure 1 is the same in all respects as the one described in the said prior application except that the H-shaped magnet is wound with a single continuous coil instead of two coils.

The instrument comprises an H magnet 10 whose crossbar carries a coil 11 and whose lower poles 12 are adapted to contact with a test piece and whose upper poles are formed with curved faces 13 concentric with a curved and tapered armature 14 rotatably mounted on a frame 15 and carrying an indicator hand 16 positioned over a scale 17. A suitable spring (not shown) is used to resist movement of the armature 14 and return it to the zero end of the scale.

This part of the instrument indicates hardness by indicating the proportion of the magnetic flux that passes between the upper poles 13 of the magnet.

The same instrument is provided with a depth gauge which consists of a voltmeter 20 with its scale graduated to indicate depth of penetration.

Current for actuating these portions of the instrument is generated by the means shown in the upper part of Figure 1 and in Figures 2 to 6.

This generating means consists, first, of a constant speed motor 30 operating from power lines 31 and driving a direct current generator 32 preferably on a continuation of the motor shaft. This generator supplies exciting current of a constant voltage to the alternator 40.

The alternator 40, to be described more in detail later, is mounted on a suitable base and aligned with a universal motor 33, receiving its operating current from line wires 34 in one of which is a controlling rheostat 35, which motor drives directly the alternator 40, preferably through having their rotors mounted on the same shaft.

Motor 33 also has directly connected thereto in driving relation a direct current generator 36, it being preferred to use a single shaft 37 for the rotors of all three of these devices, the alternator 40, motor 33, and generator 36. The output of generator 36 also goes mainly to a coil 50 in alternator 40, a small portion being shunted through the gauge 20.

The alternator 40 is shown more in detail in Figures 2 to 6. In these figures a housing 41 is shown to contain two field pole rings 42 and 43 spaced apart by an exciting coil 44. Of these two rings, one, for example 42, is provided with a relatively large number of pole-pieces and the other 43 with only a few. Each is also provided with the usual windings terminating in the leads 42a and 43a respectively.

The rotor for alternator 40 comprises two toothed members 45 and 46, each preferably consisting of a number of laminations secured together, mounted on the shaft 47. The member 45 is provided with as many teeth 48 as there are pole-pieces in the ring 42 while the member 46 has only two teeth 49. These two members 45 and 46 are so located as to rotate within the rings 42 and 43 respectively.

Reference to Figure 2 will show the presence of a second coil 50 within the coil 44. This coil 50 is a coil whose magnetic field is in opposition to the field produced by coil 44 and is energized by current from generator 36, so that as the speed of rotation of the shaft 47 increases, the current through coil 50 is increased.

With the arrangement of generators and motors shown, a constant excitation current is led to the coil 44 for alternator 40, while the coil 50 is supplied with a current that increases and diminishes with the speed of the two generators 40 and 36. By means, therefore, of suitably proportioned windings on coils 44 and 50 the exciting flux and consequently the voltage of alternator 40 may be regulated to vary in predetermined ratio to frequency used.

The leads 42a and 43a lead to the contacts 60 and 61 respectively, at the ends of a double pole double throw switch 62 which is connected through its blades to the H magnet 10 of the indicator, so that it is possible to use in said indicator the output from either side of alternator 40 and at the same time open the circuit through the other side.

The generator system, therefore, through its two parts will supply a current permitting a double range of frequencies, one side generating through a range extending from rather low figure to a moderately high figure, while the other side extends from a moderately high figure to a very high one. For example, from the one side, frequencies of from a hundred or less up to say six or eight hundred are obtained according to the speed of motor 33, while from the other the range will be from a few hundred up to several thousands.

Now having described the invention and the preferred form of embodiment thereof it is to be understood that the said invention is to be limited not to the specific details herein set forth but only by the scope of the claims which follow.

We claim:—

1. Means for generating an alternating current variable in frequency, with voltage varying at a predetermined ratio, said means consisting of an alternating current generator, an exciting coil therefor, means for supplying to said coil a constant excitation current, means for varying the speed of said generator, and means for varying the effect of the excitation current inversely to the variation in speed of said generator.

2. Means for generating an alternating current variable in frequency, with voltage varying at a predetermined ratio, said means consisting of an alternating current generator, an exciting coil therefor, means for supplying to said coil a constant excitation current, means for varying the speed of said generator, a direct current generator mechanically connected to said alternating current generator whereby its speed is the same, and a second exciting coil supplied with excitation current from said direct current generator and located in close proximity to the first coil, the directions of flux in said coils being opposite.

3. Means for generating an alternating current variable in frequency, with voltage varying at a predetermined ratio, said means consisting of an alternating current generator, an exciting coil therefor, means for supplying to said coil a constant excitation current, means for varying the speed of said generator, a direct current generator mechanically connected to said alternating current generator whereby its speed is the same and a second exciting coil supplied with excitation current from said direct current generator and located within the first coil, the directions of flux in said coils being opposite.

4. An alternating current generator capable of generating a current variable in frequency within wide limits, with voltage varying at a predetermined ratio, comprising a stator having a plurality of separate multipolar fields, a rotor having a like number of armature members each having a number of teeth corresponding to the number of poles in its respective field, a common excitation coil for said fields, means for supplying to said coil a constant excitation current, a second coil for opposing said excitation, means for supplying to said second coil a current variable directly with the speed of rotation of said rotor, and means for completing an electric circuit through a selected one of said fields.

THEODORE S. BINDSCHEDLER.
WILLIAM A. WOOD.